United States Patent [19]

Ootsuki et al.

[11] Patent Number: 4,955,122
[45] Date of Patent: Sep. 11, 1990

[54] LOCK UNIT FOR A FLUID COUPLING APPARATUS

[75] Inventors: Noboru Ootsuki; Katsumi Tomioka, both of Kobe; Toshihiko Oonishi, Kakogawa, all of Japan

[73] Assignee: Nippon Air Brake Co., Ltd., Kobe, Japan

[21] Appl. No.: 413,139

[22] Filed: Sep. 27, 1989

[51] Int. Cl.$^5$ .............................................. B23P 19/04
[52] U.S. Cl. .......................................... 29/237; 29/252
[58] Field of Search ................. 29/237, 238, 235, 252; 137/614.04, 615; 285/24

[56] References Cited

U.S. PATENT DOCUMENTS

| | | |
|---|---|---|
| 3,774,636 | 11/1973 | Arita . |
| 4,328,608 | 5/1982 | Gibson .................................. 29/237 |
| 4,418,458 | 12/1983 | Hunter .................................. 29/237 |

*Primary Examiner*—Robert C. Watson
*Attorney, Agent, or Firm*—Armstrong, Nikaido, Marmelstein, Kubovcik & Murray

[57] ABSTRACT

A lock system for a pipe joiner device is disclosed having a fixed-side connector block provided with at least a connector and a moving-side connector block provided with another connector for engagement with and disengagement from the foregoing connector, in which as the piston rod of a single actuator cylinder advances forward, lock levers mounted to the moving-side connector block moves forward into a connection opening formed in the fixed-side connector block and also, the positional relation between pin members fixedly mounted on the lock levers and L-shaped guide slots provided in a dog which is supported by the forward end of the piston rod for forward and backward movement varies thus to extend toggle links joined between the front ends of the lock levers and the forward end of the piston rod, so that hook portions formed on the front ends of their respective lock levers can engage with a connecting opening end area of the fixed-side connector block to join the moving-side connector block with the fixed-side connector block closely and simultaneously, to connect the connectors on both sides to each other for communication of pipings joined to the connectors. In reverse manner, when the piston rod is moved backward from the position of engagement, the lock levers retract from the connection opening in the fixed-side connector block to separate the moving-side connector block from the fixed-side connector block.

2 Claims, 8 Drawing Sheets

LOCK UNIT FOR A FLUID COUPLING APPARATUS

BACKGROUND OF THE INVENTION

1. Field of the Invention

The present invention relates to a lock unit for a fluid coupling connecting and disconnecting apparatus in which, after completion of connecting a fluid coupling by means of a working force maintained in the same direction, a locking for holding such a connected state and its releasing are performed.

2. Description of Related Art

A fluid coupling connecting apparatus, is disclosed in U.S. Pat. No. 3,774,636. In that apparatus, an access of a traveling truck to a fixed frame permits a male coupling which is not only fixed to the traveling truck but also connected to a fluid piping and a female coupling which is connected to the fixed frame to be connected to each other, while a detachment of the travelling truck from the fixed frame permits such a connection to be released.

Since there is no unit for locking the traveling truck and the fixed frame to each other in the aforementioned fluid coupling connecting apparatus, there is a danger of separating them from each other during passing of fluid after a connection of the male coupling and the female coupling has been made.

In order to prevent that danger, a fluid coupling connecting apparatus equipped with a lock unit is disclosed, for example, in Japanese Patent Provisional Publication No. SHO-61 236991. The apparatus of Japanese Patent Provisional Publication No. SHO-63-236991 as shown in FIG. 11, comprises a fixed-side connector block 100 and a moving-side connector block 101, both of which confronting each other. The fixed-side connector block 100 includes a female connector 103 joined with a connection to a fluid pipings at one end 102 and an end receiver 104 mounted to the front end of the female connector 103. The moving-side connector block 101 includes a male connector 106 joined to another connection to a fluid pipings on the other end 105, a cylinder 107 for forward and backward movement fitted through the male connector 106, a block system 108 mounted to the forward and backward cylinder 107, a spherical seal body 109 mounted to face the end receiver 104, and a positioning means 110 for directing the seal body 109 to a position confronting the receiver 104. The joiner device is operated for use in which the positioning means 110 of the moving-side connector block 101 is first actuated to force the male connector 106 to face the fixed-side connector block 100 and then, a connecting cylinder 111 is actuated to move both the male connector 106 and the forward and backward cylinder 107 leftward of FIG. 11 so that the seal body 109 presses against the end receiver 104. Under this condition, compressed air is supplied through an inlet opening 107a in the forward and backward cylinder 107 to move an outer tube 107b of the cylinder 107 forward (see FIG. 12). As the outer tube 107b advances forward, the lock system 108 are pivoted to engage with a flange 104a of the end receiver 104 as shown.

According to the prior art described in the foregoing Publication, after the connecting cylinder 111 actuates the male connector 106 to press against the end receiver 104, the forward and backward cylinder 107 allows the lock system 108 to engage with the flange 104a of the end receiver 104. This procedure requires at least a couple of cylinders 111 and 107 installed, which will thus cause the system to be greater in size, intricate in operation, and high in cost. Additionally, it is understood that the two cylinders 111, 107 should be sequence controlled with accuracy to assure the connection of pipings. If not or when there is any inconsistency in the control, the movement for connection will go jerky.

Furthermore, the prior art is disclosed that the outer cylinder 107b of the forward and backward cylinder 107 is displaced leftward of FIG. 12 for engagement of the lock system 108 with the flange 104a of the end receiver 104, the compressed air supplied through the inlet opening 107a forces a piston 107c to move rightward of FIG. 12 and simultaneously, exerts a force of rightward pressing on the seal body 109 joined with the piston 107c. This will cause a decrease in the joining force between the seal body 109 and the end receiver 104 and accordingly, the sealing effect at the connection may be deteriorated.

SUMMARY OF THE INVENTION

The present invention is directed in view of the foregoing respects towards an improved lock system comprising a fixed-side connector block having a connector(s) thereon and a connection opening therein, a moving-side connector block having a connector(s) thereon for engagement with the connector(s) of the fixed-side connector block and a connection opening therein and also, mounted to confront the fixed-side connector block and to be actuated by an actuator cylinder for movement, a flange fixedly mounted corresponding to the connection opening of the moving-side connector block, a piston rod in the actuator cylinder slidably fitted into a center wall of the flange, a slide block supported by the front end of the piston rod for axial movement and urged by a spring extending thereto from the center wall of the flange, a pair of lock levers, each of which being mounted at the front end via toggle links to the forward end of the piston rod and at the rear end, turnably fitted between the connection opening end periphery of the moving-side connector block and the periphery of the center wall of the flange, a dog fixedly mounted to the slide block and having L-shaped guide slots therein, each slot including a lengthwisely extending horizontal portion and a vertical portion extending from the front end of the horizontal portion in a direction of lock lever opening, and pin members mounted on lengthwise intermediate portions of the lock levers respectively for fitting in the L-shaped guide slots of the dog. Each of the lock levers has a hook portion formed in the front outer end thereof for engagement with a connection opening end portion of the fixed-side connector block. While the toggle links are folded, the front ends of the lock levers can move into the connection opening of the fixed-side connector block. When the toggle links are extended open during the insertion, the hook portions of the lock levers can engage with the connection opening end portion of the fixed-side connector block.

More particularly, when the toggle links are folded and thus, the front ends of the lock levers are kept close to each other with their pin members being engaged with the horizontal portions of the L-shaped guide slots in the dog, the forward movement of the piston rod of the actuator cylinder allows the moving-side connector block engaged with the rear ends of the lock levers to move forward with the arrangement of the toggle links, dog, and lock levers remaining unchanged. At the time, each pin member on the lock lever is kept engaged with the horizontal portion of the L-shaped guide slot in the dog by a yielding tension of the spring and thus, the front ends of the lock levers are prevented from opening and remain closed.

As the piston rod advances forward, the front ends of the lock levers are moved into the connection opening of the fixed-side connector block. Then, when the dog reaches the fixed-side connector block and ceases its forward movement, the lock levers continues to move forward relatively to the dog and thus, the engaging position of each pin member in the L-shaped guide slot is shifted from the horizontal portion to the vertical portion of the L-shaped slot. Under such a condition, as the piston rod advances further in the forward direction, the pin members move along the vertical portions of the L-shaped guide slots so as to extend the toggle links and open the lock levers. Accordingly, each hook portion formed on the front outer end of the lock lever becomes engaged with the connection opening end of the fixed-side connector block. As the result, both the fixed-side and moving-side connector blocks are securely joined to each other by the movement of the single actuator cylinder and with the connectors on the two connector blocks being engaged with each other, pipings joined to the connectors on both sides will be communicated with each other.

BRIEF DESCRIPTION OF THE DRAWINGS

FIG. 4-b is a longitudinal cross-sectional side view showing the arrangement of a moving-side connector block and a lock system;

PREFERRED EMBODIMENT OF THE INVENTION

A preferred embodiment of the present invention will be described in conjunction with the accompanying drawings.

FIGS. 1 to 10 illustrate a preferred embodiment of the present invention.

Figure 1:
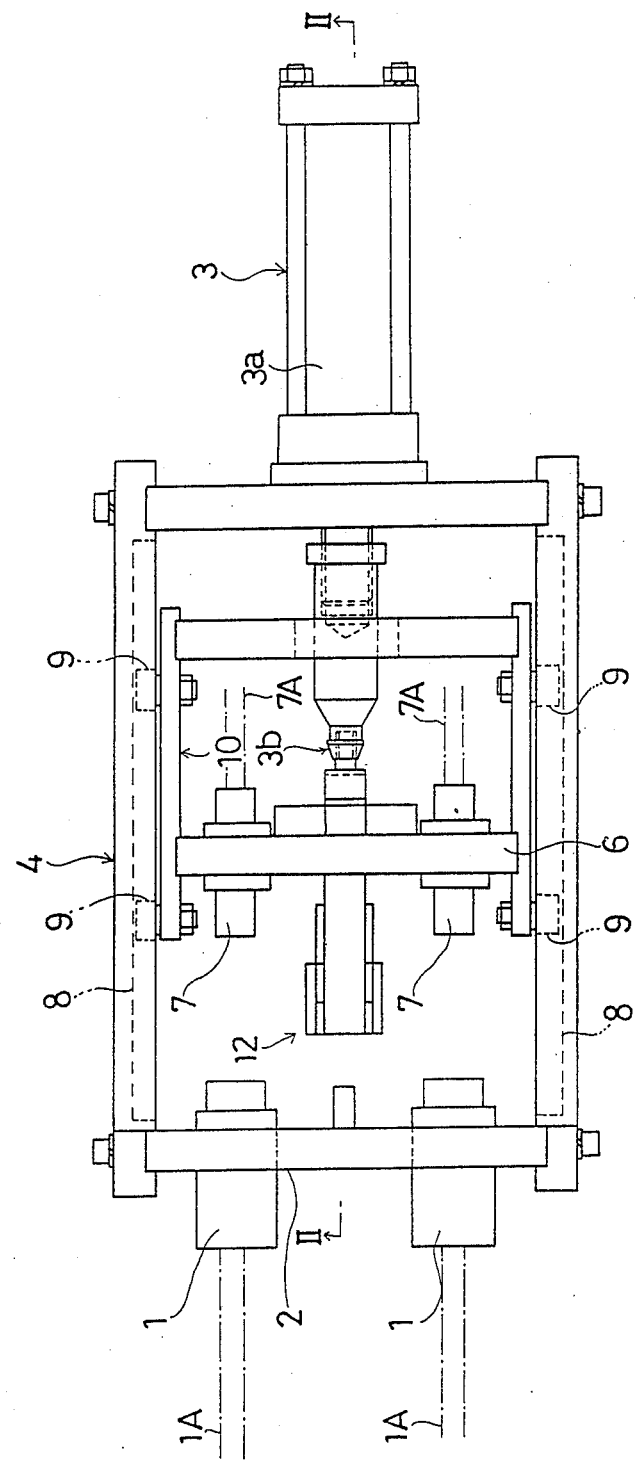
FIG. 1 is a plan view showing the complete arrangement of a pipe joiner device.
Figure 2:
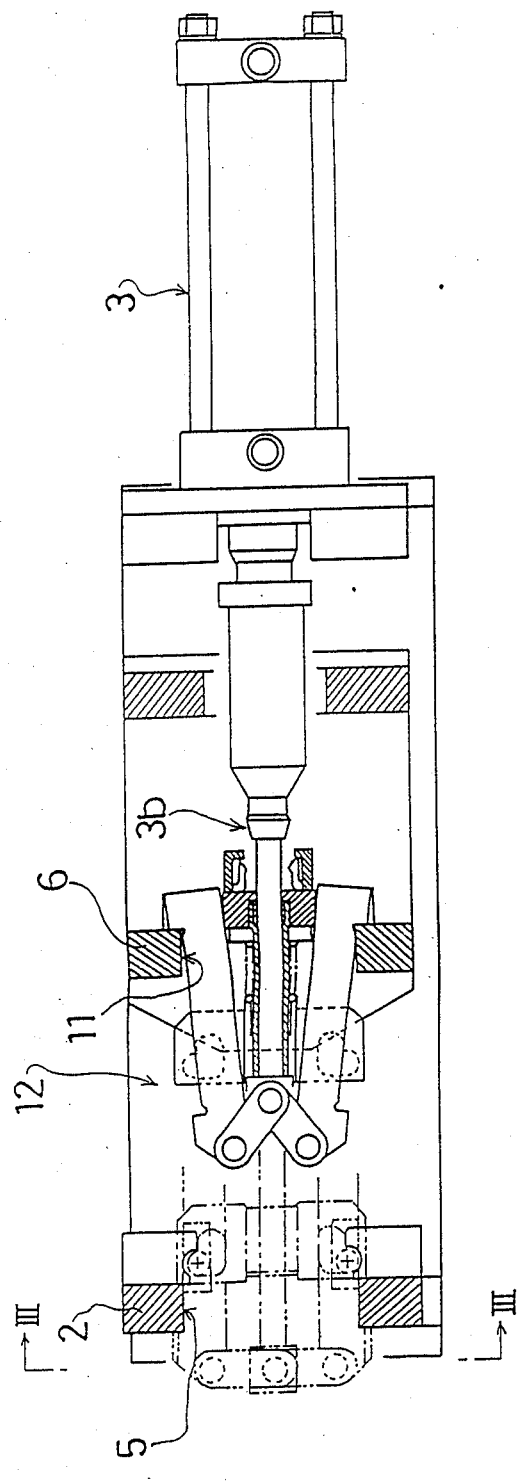
FIG. 2 is a longitudinal cross-sectional side view taken along the line II—II of FIG. 1.
Figure 3:
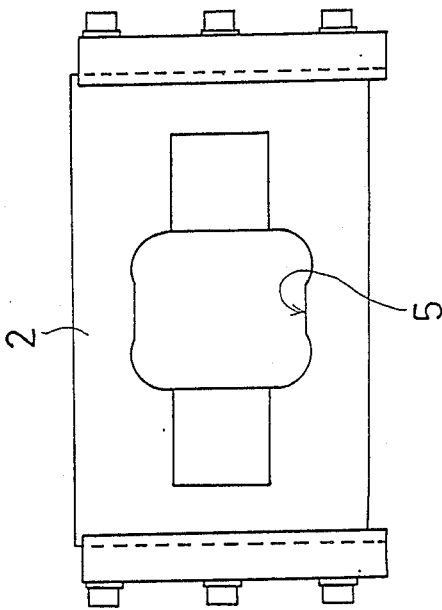
FIG. 3 is a view from the viewpoint III—III of FIG. 2.

FIG. 1 shows a lock unit for a fluid coupling connecting and disconnecting apparatus according to the present invention, in which a fixed-side connector block 2 provided with a plurality of female connectors 1, 1 for connection to a fluid pipings at one end 1A is fixedly mounted to an outer framework 4 having a cylinder body 3a of an actuator cylinder 3 fixedly supported thereby. The fixed-side connector block 2 also has a connection opening 5 provided in the center thereof (see FIG. 3). In the front of the fixed-side connector block 2, there is a moving-side connector block 6 mounted for engagement with the plural female connectors 1, 1 and provided with a plurality of male connectors 7, 7 for connection to a fluid pipings on the other end 7A. The moving-side connector block 6 also has a connection opening 11 provided in the center thereof and is fixedly mounted to an inner framework 10 having four of rollers 9, . . . 9 for rolling on rails 8 mounted to the outer framework 4. In particular, the moving-side connector block 6 accommodates a lock system 12 shown in FIG. 1. The lock system 12 is connected to a piston rod 3b of the actuator cylinder 3 and thus, will be moved by the movement of the actuator cylinder 3 for connection between both the connector blocks 2 and 6, as represented by the chain line in FIG. 2, with the connectors 1,1 and 7,7 engaged with each other respectively.

The arrangement of the lock system 12 will then be described in detail referring to FIGS. 4 to 10.

Figure 4B:
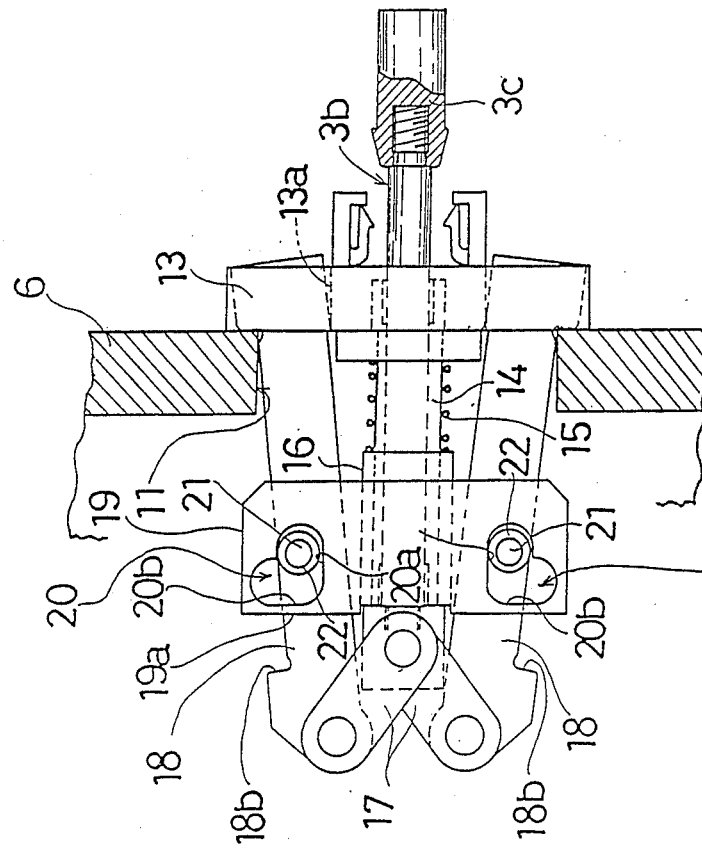
FIG. 4-a is a longitudinal cross-sectional side view of a fixed-side connector block.
Figure 4A:
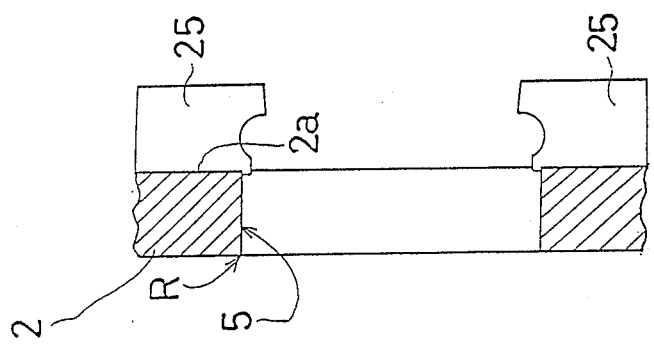
Figure 5:
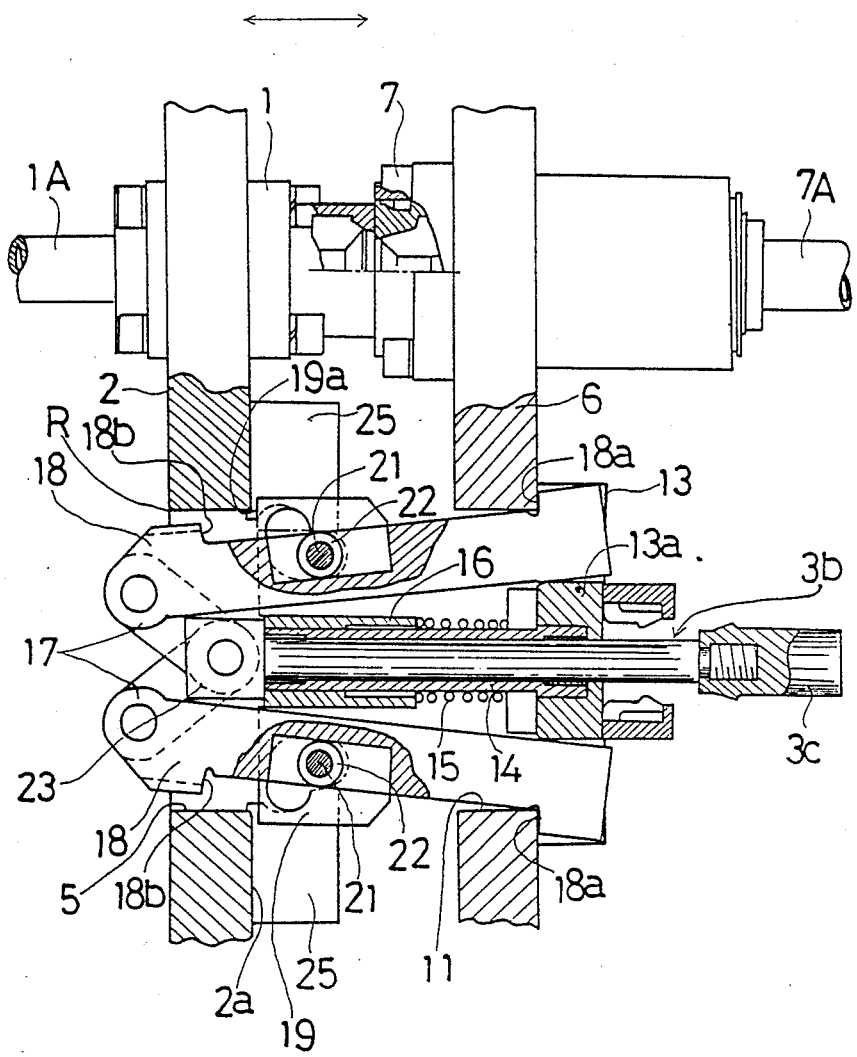
FIG. 5 is a longitudinal cross-sectional side view showing before the connection between both the connectors blocks.
Figure 6:
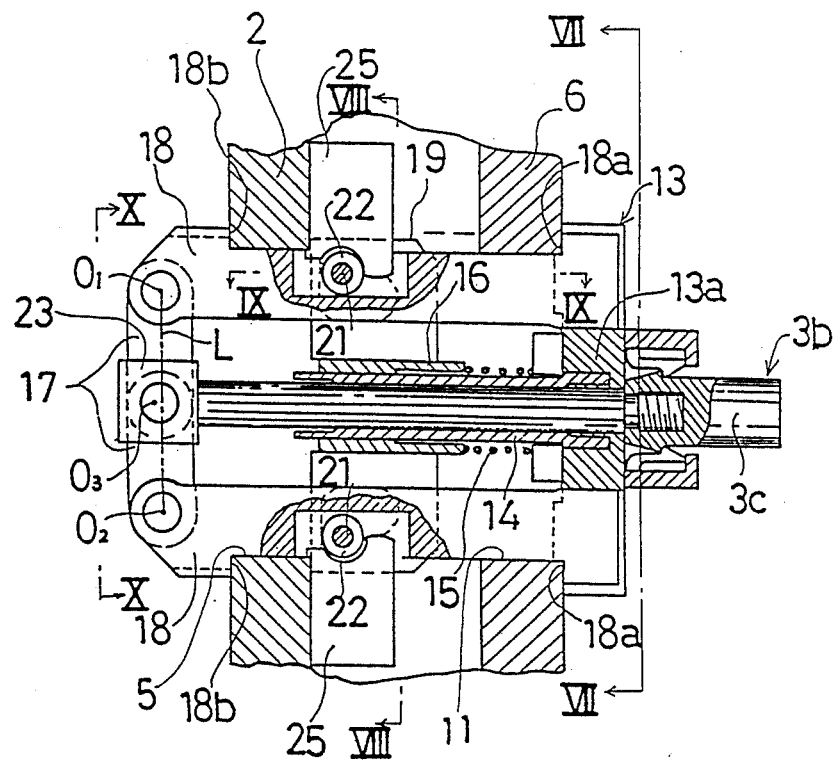
FIG. 6 is a longitudinal cross-sectional side view showing the connection between both the connector blocks.
Figure 7:
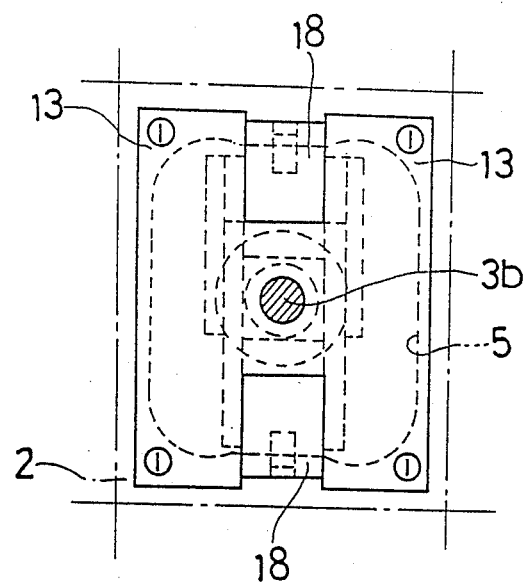
FIG. 7 is a cross-section view taken along the line VII—VII of FIG. 6.
Figure 8:
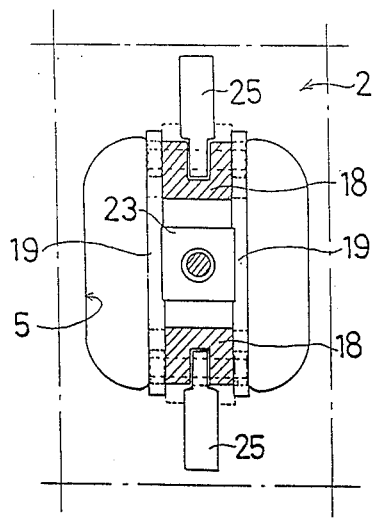
FIG. 8 is a cross-sectional view taken along the line VIII—VIII of FIG. 6.

As best shown in FIGS. 4 to 6, the lock system 12 includes a flange 13 having a center wall 13a thereof and mounted about the connection opening 11 in the moving-side connector block 6, a rod guide 14 fixedly mounted on the center wall 13a for guiding the piston rod 3a of the actuator cylinder 3, a slide block 16 slidably fitted onto the rod guide 14 and being yieldingly urged by a spring 15 extending from the center wall 13a of the flange 13, and a pair of lock levers 18, 18 joined at the front end thereof to the forward end of the piston rod 3b via a couple of toggle links 17, 17.

Figure 9:
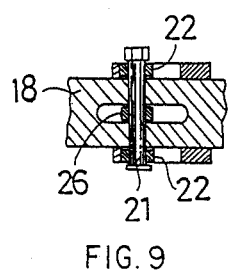
FIG. 9 is a cross-sectional view taken along the line IX—IX of FIG. 6.

The slide block 16 incorporates a dog 19 which is fixedly arranged to actuate the toggle links 17, 17 to be folded when both the connector blocks 2 and 6 move away from each other as shown in FIG. 4, so that the lock levers 18, 18 are kept close to each other in the front end. The dog 19 is provided with L-shaped guide slots 20, each having a lengthwisely extending horizontal portion 20a and a vertical portion 20b which extends from the front end of the horizontal portion 20a in a direction of the lock lever 18 opening. Accepted in the L-shaped guide slot 20 is a roller 22 mounted via a pin 21 to the lock lever 18. As best shown in FIG. 9, when the connector blocks 2 and 6 remain spaced from each other, the roller 22 is kept engaged with the horizontal portion 20a of the L-shaped guide slot 20 by yielding force of the spring 15.

Figure 10:
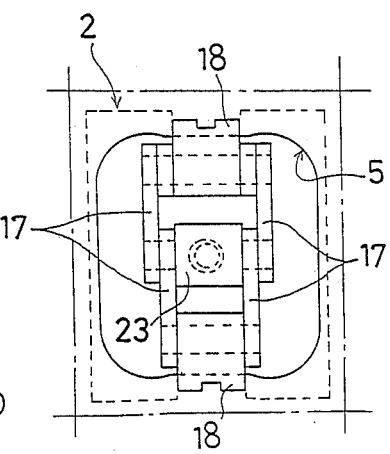
FIG. 10 is a view from the viewpoint X—X of FIG. 6.
Figure 11:
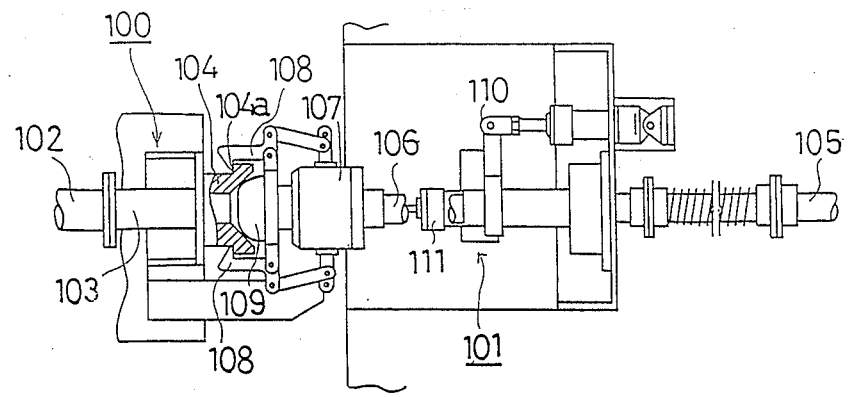
FIGS. 11 and 12 are illustrations of prior art systems respectively.
Figure 12:
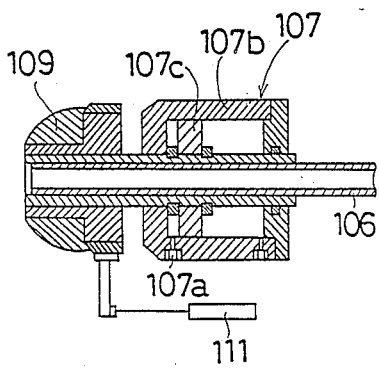

The toggle links 17, 17 mounted to the front ends of the lock levers 18, 18 are at one end pivotably joined to the lock levers 18, 18 and at the other end to a connecting block 23 mounted on the forward end of the piston rod 3b, as shown in FIG. 10. The rear ends of the lock levers 18, 18 are inserted between a connection opening 11 end portion of the moving-side connector block 6 and the outer face of the center wall 13a of the flange 13 while hook portions 18a, 18a formed on the rear outer ends of the lock levers 18, 18 respectively being engaged with the connection opening 11 end portion of the moving-side connector block 6, so that they can turn about the engaging points. Also, the lock lever 18 has another hook portion 18b formed on the front outer end thereof for engagement with a connection opening 5 end portion of the fixed-side connector block 2.

The movement in the embodiment will now be described.

When the actuator cylinder 3 filled with pressured oil actuates the piston rod 3b to move forward, the toggle links 17, 17 are folded and each of the pins 21, 21 (rollers 22, 22) is engaged with the horizontal portion 20a of the L-shaped guide slot 20, as shown in FIG. 4-a. As the front ends of the lock levers 18, 18 are kept close to each other, the moving-side connector block 6 advances forward. More specifically, as the piston rod 3b moves forward, as shown in FIG. 5, the front end of each lock lever 18 is displaced into the connection opening 5 of the fixed-side connector block 2 and then, a front side 19a of the dog 19 comes into contact with a side 2a of the fixed-side connector block 2. At the time, the hook portion 18b of each lock lever 18 is located adjacent to a curved corner of the connection opening 5 in the fixed-side connector block 2. In this situation, the plural female connectors 1, 1 and the plurality of male connectors 7, 7 are almost connected to each other.

When the piston rod 3b further advances forward from the previous location, each of lock levers 18 moves relative to the dog 19 and thus, its pin 21 (roller 22) is disengaged from the horizontal portion 20a of the L-shaped guide slot 20 and moved to the vertical portion 20b of the same slot 20. Accordingly, as shown in FIG. 6, the toggle links 17, 17 become extended due to the forward movement of the piston rod 3b and thus, the front ends of the lock levers 18, 18 are extensively open to allow their respective front hook portions 18b, 18b to engage with the connection opening 5 end portion of the fixed-side connector block 2. In this situation, the plural female connectors 1, 1 and the plurality of male connectors 7, 7 are perfectly connected to each other. Simultaneously, the front end of a fitting 3c on the piston rod 3b comes into contact with the center wall 13a of the flange 13 and the rear hook portion 18a of each lock lever 18 is closely engaged with the connection opening 11 end portion of the moving-side connector block 6.

On the other hand, when the piston rod 3b of the actuator cylinder 3 is released from the connection between both the connector blocks 2 and 6 shown in FIG. 6 and moves backward, the toggle links 17, 17 are folded by the retraction of the piston rod 3b adversely to the preceding action and thus, the front ends of the lock levers 18, 18 become close to each other. At the moment when the front face of the connecting block 23 joining between the forward end of the piston rod 3b and the ends of the toggle links 17, 17 reaches the point of contact with the front end of the rod guide 14, each pin 21 (roller 22) is situated at the horizontal portion 20a of the L-shaped guide slot 20. Under this condition, a pulling force of the piston rod 3b is transferred via the rod guide 14 to the flange 13 and thus, the moving-side connector block 6 can be moved backward by the retracting motion of the piston rod 3b ................ and the connection between both the plural female connector 1, 1 and the plurality of male connectors 7, 7 be released each other.

As shown in FIG. 6, the line L which extends between the center points of connection 01 and 02 of the toggle links 17, 17 with their respective lock levers 18, 18, is located on the right of the center point of connection 03 of the toggle linke 17, 17 with the forward end of the piston rod 3b. This allows a force exerted on the front end of each lock lever 18 for closing movement to partially act on the piston rod 3b for forward movement. Accordingly, both the connector block 2 and 6 can remain coupled with each other securely even if the foregoing force is exerted.

According to the embodiment, the fixed-side connector block 2 incorporates a couple of roller guides 25 thereof, each of which being engaged with a center roller 26 mounted to the lock lever 18 by the pin 21 as shown in FIG. 9, thus assuring both the actions of connection and lockup.

The lock system for a pipe joiner device according to the present invention is operable in a manner as set forth above in which the piston rod of the single cylinder is actuated for forward movement to force the moving-side connector block in a forward direction together with the lock system of which lock levers then move with their respective front ends kept adjacent to each other into the connection opening in the fixed-side connector block and will further be moved forward to cause the front ends of the lock levers to open extensively for engagement of their respective hook portions with the connection opening end portion of the fixed-side connector block. More specifically, the complete action of connecting between the connector blocks can be performed with the use of a single actuator cylinder and thus, as compared with the prior art employing a plurality of like cylinders, this improved system allows the pipe joiner device to be smaller in size, less intricate in arrangement, and much reduced in cost. Additionally, there is no need of sequence control for plural cylinders, thus assuring the ready and secure connection of pipings.

Furthermore, the lock system for pipe joiner device allows no force to be exerted on the joint for lessening the connection between the connector blocks during and in the end of connecting movement of the connector blocks, whereby both the connector blocks can closely be retained with each other and thus, the sealing effect at the joint will be improved.

We claim:

1. A lock unit for a fluid connecting and disconnecting apparatus of a construction in which one fluid coupling is held stationary and a second fluid coupling is moved into connection with said one fluid coupling comprising:
   a main body,
   a first connecting member stationary on said main body, said first connecting member having a first connection opening and means for holding said one fluid coupling,
   a second connecting member opposing said first connecting member and movably mounted on said main body for movement toward and away from said first connecting member, said second connecting member having a second connection opening and means for holding said second fluid coupling,
   an actuator cylinder mounted to said main body and having a piston rod for moving said second connecting member,
   a flange provided in said second connection opening,
   a lock lever, said lock lever having one end provided between said flange and said second connection opening, and being rotatable relative to said second connection opening, a second end of said lever having a hook for detachably locking said lever to said first connecting member, a pin mounted to said lever and a toggle link connecting said second end of said lever to an end of said piston rod projecting through said second connection opening, a dog provided between said flange and said toggle link connection with said piston rod, said dog being biased toward said toggle link connection, a slot in said dog and receiving said pin, said slot having a first portion extending in a longitudinal direction of said lever and a second portion normal to said first portion, said pin riding in said first portion of said slot and preventing outward movement of said second end of said lever as said dog is biased toward said toggle link connection and said piston rod is moved to move said second connecting member toward said first connecting member and said pin is movable into said second portion of said slot as said dog contacts said first connecting member and displaces the means biasing said dog to permit outward movement of said second end of said lever to engage said hook with said first connecting member and detachably lock said second connecting member with said first connecting member with said second fluid coupling connected to said one fluid coupling.

2. The lock unit defined by claim 1 and further comprising a pair of lock levers with the second end of each lock lever having a hook for detachably locking said levers to said first connecting member, a pair of toggle links connecting said lock levers to said end of said piston rod, and a line (L) connecting the center points of the connection of the toggle links with their respective lock levers when the lock lever hooks engage said first connecting member is located on a side of the center point of the connection of said toggle links with said piston rod toward said second connecting member.

* * * * *